(12) United States Patent
Millard et al.

(10) Patent No.: US 7,484,094 B1
(45) Date of Patent: Jan. 27, 2009

(54) OPENING COMPUTER FILES QUICKLY AND SAFELY OVER A NETWORK

(75) Inventors: John Millard, Pasadena, CA (US); Mark Spiegel, West Hills, CA (US)

(73) Assignee: Symantec Corporation, Cupertino, CA (US)

( * ) Notice: Subject to any disclaimer, the term of this patent is extended or adjusted under 35 U.S.C. 154(b) by 720 days.

(21) Appl. No.: 10/846,100

(22) Filed: May 14, 2004

(51) Int. Cl.
*H04L 9/00* (2006.01)

(52) U.S. Cl. .......................... 713/165; 726/22
(58) Field of Classification Search ................ 713/165; 726/22
See application file for complete search history.

(56) References Cited

U.S. PATENT DOCUMENTS

| | | | |
|---|---|---|---|
| 5,398,196 A | 3/1995 | Chambers | |
| 5,440,723 A | 8/1995 | Arnold et al. | |
| 5,452,442 A | 9/1995 | Kephart | |
| 5,473,769 A | 12/1995 | Cozza | |
| 5,491,791 A * | 2/1996 | Glowny et al. ............... 714/37 |
| 5,495,607 A | 2/1996 | Piscello et al. | |
| 5,572,590 A | 11/1996 | Chess | |
| 5,675,710 A | 10/1997 | Lewis | |
| 5,694,569 A | 12/1997 | Fischer | |
| 5,696,822 A | 12/1997 | Nachenberg | |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,826,249 A | 10/1998 | Skeirik | |
| 5,832,208 A | 11/1998 | Chen et al. | |
| 5,832,527 A | 11/1998 | Kawaguchi | |
| 5,854,916 A | 12/1998 | Nachenberg | |
| 5,884,033 A | 3/1999 | Duvall et al. | |
| 5,889,943 A | 3/1999 | Ji et al. | |
| 5,944,821 A | 8/1999 | Angelo | |
| 5,949,973 A | 9/1999 | Yarom | |
| 5,951,698 A | 9/1999 | Chen et al. | |
| 5,956,481 A | 9/1999 | Walsh et al. | |
| 5,960,170 A | 9/1999 | Chen et al. | |

(Continued)

FOREIGN PATENT DOCUMENTS

DE 100 21 686 A1 11/2001

(Continued)

OTHER PUBLICATIONS

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

(Continued)

*Primary Examiner*—Kristine Kincaid
*Assistant Examiner*—Harris C Wang
(74) *Attorney, Agent, or Firm*—Fenwick & West LLP (57) ABSTRACT

Computer implemented methods, apparati, and computer-readable media for quickly and safely opening computer files over a network. In a method embodiment of the present invention, a local computer (10) initiates a test open of a file (14) associated with a remote computer (12) that is coupled to the local computer (10) over the network (15). When the test open discloses that the remote computer (12) has an acceptable malicious code scanning means (13), the local computer (10) performs an actual open of the file (14).

26 Claims, 3 Drawing Sheets

U.S. PATENT DOCUMENTS

| | | | |
|---|---|---|---|
| 5,974,549 A | 10/1999 | Golan | |
| 5,978,917 A | 11/1999 | Chi | |
| 5,987,610 A | 11/1999 | Franczek et al. | |
| 6,006,242 A | 12/1999 | Poole et al. | |
| 6,021,510 A | 2/2000 | Nachenberg | |
| 6,023,723 A | 2/2000 | McCormick et al. | |
| 6,052,709 A | 4/2000 | Paul | |
| 6,070,244 A | 5/2000 | Orchier et al. | |
| 6,072,830 A | 6/2000 | Proctor et al. | |
| 6,072,942 A | 6/2000 | Stockwell et al. | |
| 6,088,803 A | 7/2000 | Tso et al. | |
| 6,092,194 A | 7/2000 | Touboul | |
| 6,094,731 A | 7/2000 | Waldin et al. | |
| 6,104,872 A | 8/2000 | Kubota et al. | |
| 6,108,799 A | 8/2000 | Boulay et al. | |
| 6,125,459 A | 9/2000 | Andoh et al. | |
| 6,161,130 A | 12/2000 | Horvitz et al. | |
| 6,167,434 A | 12/2000 | Pang | |
| 6,192,379 B1 | 2/2001 | Bekenn | |
| 6,199,181 B1 | 3/2001 | Rechef et al. | |
| 6,253,169 B1 | 6/2001 | Apte et al. | |
| 6,275,938 B1 | 8/2001 | Bond et al. | |
| 6,298,351 B1 | 10/2001 | Castelli et al. | |
| 6,338,141 B1 | 1/2002 | Wells | |
| 6,347,310 B1 | 2/2002 | Passera | |
| 6,357,008 B1 | 3/2002 | Nachenberg | |
| 6,370,526 B1 | 4/2002 | Agrawal et al. | |
| 6,370,648 B1 | 4/2002 | Diep | |
| 6,397,200 B1 | 5/2002 | Lynch et al. | |
| 6,397,215 B1 | 5/2002 | Kreulen et al. | |
| 6,401,122 B1 | 6/2002 | Matsui et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,535,891 B1 | 3/2003 | Fisher et al. | |
| 6,546,416 B1 | 4/2003 | Kirsch | |
| 6,552,814 B2 | 4/2003 | Okimoto et al. | |
| 6,611,925 B1 * | 8/2003 | Spear | 714/38 |
| 6,622,150 B1 | 9/2003 | Kouznetsov et al. | |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,751,789 B1 | 6/2004 | Berry et al. | |
| 6,763,462 B1 | 7/2004 | Marsh | |
| 6,772,346 B1 | 8/2004 | Chess et al. | |
| 6,813,712 B1 | 11/2004 | Luke | |
| 6,842,861 B1 | 1/2005 | Cox et al. | |
| 6,851,057 B1 | 2/2005 | Nachenberg | |
| 6,873,988 B2 | 3/2005 | Herrmann et al. | |
| 6,886,099 B1 | 4/2005 | Smithson et al. | |
| 6,910,134 B1 | 6/2005 | Maher et al. | |
| 6,944,555 B2 | 9/2005 | Blackett et al. | |
| 6,952,779 B1 | 10/2005 | Cohen et al. | |
| 6,973,578 B1 | 12/2005 | McIchione | |
| 7,024,403 B2 | 4/2006 | Kyler | |
| 7,228,299 B1 * | 6/2007 | Harmer et al. | 707/3 |
| 7,249,175 B1 * | 7/2007 | Donaldson | 709/225 |
| 2002/0004908 A1 | 1/2002 | Galea | |
| 2002/0035693 A1 | 3/2002 | Eyres et al. | |
| 2002/0035696 A1 | 3/2002 | Thacker | |
| 2002/0038308 A1 | 3/2002 | Cappi | |
| 2002/0046207 A1 | 4/2002 | Chino et al. | |
| 2002/0046275 A1 | 4/2002 | Crosbie et al. | |
| 2002/0073046 A1 | 6/2002 | David | |
| 2002/0083175 A1 | 6/2002 | Afek et al. | |
| 2002/0087649 A1 | 7/2002 | Horvitz | |
| 2002/0091940 A1 | 7/2002 | Wellborn et al. | |
| 2002/0103783 A1 | 8/2002 | Muhlestein | |
| 2002/0116542 A1 | 8/2002 | Tarbotton et al. | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2002/0178375 A1 | 11/2002 | Whittaker et al. | |
| 2002/0194488 A1 | 12/2002 | Cormack et al. | |
| 2002/0194489 A1 | 12/2002 | Almogy et al. | |
| 2002/0199186 A1 | 12/2002 | Ali et al. | |
| 2002/0199194 A1 | 12/2002 | Ali | |
| 2003/0023865 A1 | 1/2003 | Cowie et al. | |
| 2003/0023875 A1 | 1/2003 | Hursey et al. | |
| 2003/0033587 A1 | 2/2003 | Ferguson et al. | |
| 2003/0051026 A1 | 3/2003 | Carter et al. | |
| 2003/0061287 A1 | 3/2003 | Yu et al. | |
| 2003/0065793 A1 | 4/2003 | Kouznetsov et al. | |
| 2003/0065926 A1 | 4/2003 | Schultz et al. | |
| 2003/0110280 A1 | 6/2003 | Hinchliffe et al. | |
| 2003/0110393 A1 | 6/2003 | Brock et al. | |
| 2003/0110395 A1 | 6/2003 | Presotto et al. | |
| 2003/0115458 A1 | 6/2003 | Song | |
| 2003/0115479 A1 | 6/2003 | Edwards et al. | |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 | 7/2003 | Radatti | |
| 2003/0154394 A1 | 8/2003 | Levin | |
| 2003/0167402 A1 | 9/2003 | Stolfo et al. | |
| 2003/0191966 A1 | 10/2003 | Gleichauf | |
| 2003/0212902 A1 | 11/2003 | van der Made | |
| 2003/0233352 A1 | 12/2003 | Baker | |
| 2003/0233551 A1 | 12/2003 | Kouznetsov et al. | |
| 2003/0236995 A1 | 12/2003 | Fretwell, Jr. | |
| 2004/0015554 A1 | 1/2004 | Wilson | |
| 2004/0015712 A1 | 1/2004 | Szor | |
| 2004/0015726 A1 | 1/2004 | Szor | |
| 2004/0030913 A1 | 2/2004 | Liang et al. | |
| 2004/0039921 A1 | 2/2004 | Chuang | |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0158730 A1 | 8/2004 | Sarkar | |
| 2004/0162808 A1 | 8/2004 | Margolus et al. | |
| 2004/0177247 A1 | 9/2004 | Peles | |
| 2004/0181687 A1 | 9/2004 | Nachenberg et al. | |
| 2004/0220975 A1 | 11/2004 | Carpentier et al. | |
| 2005/0021740 A1 | 1/2005 | Bar et al. | |
| 2005/0044406 A1 | 2/2005 | Stute | |
| 2005/0132205 A1 | 6/2005 | Palliyil et al. | |
| 2005/0144288 A1 | 6/2005 | Liao | |
| 2005/0177736 A1 | 8/2005 | De los Santos et al. | |
| 2005/0204150 A1 | 9/2005 | Peikari | |
| 2005/0246767 A1 | 11/2005 | Fazal et al. | |
| 2005/0262570 A1 | 11/2005 | Shay | |
| 2006/0064755 A1 | 3/2006 | Azadet et al. | |

FOREIGN PATENT DOCUMENTS

| | | |
|---|---|---|
| EP | 0636977 A2 | 2/1995 |
| EP | 1 280 039 A | 1/2003 |
| EP | 1408393 A2 | 4/2004 |
| GB | 2 364 142 A | 1/2002 |
| WO | WO 93/25024 A1 | 12/1993 |
| WO | WO 97/39399 A | 10/1997 |
| WO | WO 99/15966 A1 | 4/1999 |
| WO | WO 00/28420 A2 | 5/2000 |
| WO | WO 01/37095 A1 | 5/2001 |
| WO | WO 01/91403 A | 11/2001 |
| WO | WO 02/05072 A | 1/2002 |

WO    WO 02/33525 A2    4/2002

OTHER PUBLICATIONS

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Burchell, Jonathan, "NetShield 1.5", Virus Bulletin, Aug. 1994, pp. 21-23, XP 000617453.

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Von Babo, Michael, "Zehn Mythnum Computerviren: Dichtug Und Wahrheit Uber Den Schrecken Des Informatkzeitlers," *Technische Kundschau*, Hallwag, Bern CH vol. 84, No. 36. Sep. 4, 1992, pp. 44-47.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL:http://www.Microsoft.com/hwdev/archive/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL:http//www.wackyb.co.nz/mesfp.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR:http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL:http://outlook.spambully.com/about.php>.

"Enterprise Protection Strategy"[online] Trend Micro Inc. [retrieved Dec. 3, 2002] Retrieved from the Internet: <URL:http://www.trendmicro.com/en/products/eps/features.htm>.

"How to Test Outbreak Commander", :Trend Micro Inc., Aug. 2002, pp. 1-13, Cupertino, CA.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Choi, Yang-Seo, et al., "A New Stack Buffer Overflow Hacking Defense Technique with Memory Address Confirmation", Lecture Notes in Computer Science 2288, 2002, pp. 146-159, Springer Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Randustack web pages [online]. Virtualave.net [first retrieved May 1, 2003]. Retrieved from the Internet: <URL:http://pageexec.virualave.net/docs/randustack.txt>, copy retrieved Mar. 21, 2005 from <http://www.pax.grsecurity.net/docs/randustack.txt>.

Randkstack web pages [online]. Virtualave.net [first retrieved May 1, 2003]. Retrieved from the Internet: <URL:http://pageexec.virualave.net/docs/randkstack.txt>, copy retrieved Mar. 21, 2005 from <http://www.pax.grsecurity.net/docs/randstack.txt>.

Randmap web pages [online]. Virtualave.net [first retrieved May 1, 2003]. Retrieved from the Internet: <URL:http://pageexec.virualave.net/docs/randmmap.txt>, copy retrieved Mar. 21, 2005 from <http://www.pax.grsecurity.net/docs/randmmap.txt>.

Randexec web pages [online]. Virtualave.net [first retrieved May 1, 2003]. Retrieved from the Internet: <URL:http://pageexec.virualave.net/docs/randexec.txt>, copy retrieved Mar. 21, 2005 from <http://www.pax.grsecurity.net/docs/randexec.txt>.

VMA Mirroring web pages [online]. Virtualave.net [retrieved May 1, 2003]. Retrieved from the Internet: <URL:http://pageexec.virualave.net/docs/vmmirror.txt>, copy retrieved Mar. 21, 2005 from <http://www.pax.grsecurity.net/docs/vmmirror.txt>.

Aho, Alfred V., et al. Compilers, Addison-Wesly Publishing Company, USA, revised edition 1988, pp. 585-598, 633-648.

Periot, Frederic, "Defeating Polymorphism Through Code Optimization", Paper given at the Virus Bulletin conference, Sep. 26-Oct. 27, 2003 pp. 142-159, Toronto, Canada, published by Virus Bulletin Ltd., The pentagon, Abington, Oxfordshire, England.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL:http://research.microsoft.com/sn/farsite/wss2000.pdf>.

Bontchev, Vesselin, "Possible Macro Virus Attacks and How to Prevent Them", Computer & Security, vol. 15, No. 7, pp. 595-626, 1996.

Von Babo, Michael, "Zehn Mythen um Computerviren: Dichtung und Wahrheit über den Schrecken des Informatikzeitalters," Technische Rundschau, Hallwag, Bern, Switzerland, vol. 84, No. 36, Sep. 4, 1992, pp. 44-47.

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Parkhouse, Jayne, Pelican SafeTNet 2.0, SCMagazine Product Review, (SC Magazine, Framingham, Massachusetts, USA) Jun. 2000 http://www.scmagazine.com/scmagazine/standalone/pelican/sc_pelican.html.

* cited by examiner

Prior Art

OPENING COMPUTER FILES QUICKLY AND SAFELY OVER A NETWORK

RELATED APPLICATION

This patent application claims priority upon commonly owned U.S. patent application Ser. No. 10/846,109 filed May 14, 2004, entitled "Protecting a Computer Coupled to a Network from Malicious Code Infections", which patent application is hereby incorporated by reference in its entirety into the present patent application.

TECHNICAL FIELD

This invention pertains to the field of opening computer files quickly and safely over a network.

BACKGROUND ART

As used herein, "malicious computer code" is any code that enters a computer without the knowledge and/or consent of an authorized user of the computer and/or a system administrator of an enterprise incorporating the computer. Thus, "malicious computer code" encompasses, but is not limited to, viruses, worms, Trojan horses, spam, adware, and unwanted popups.

Figure 1:
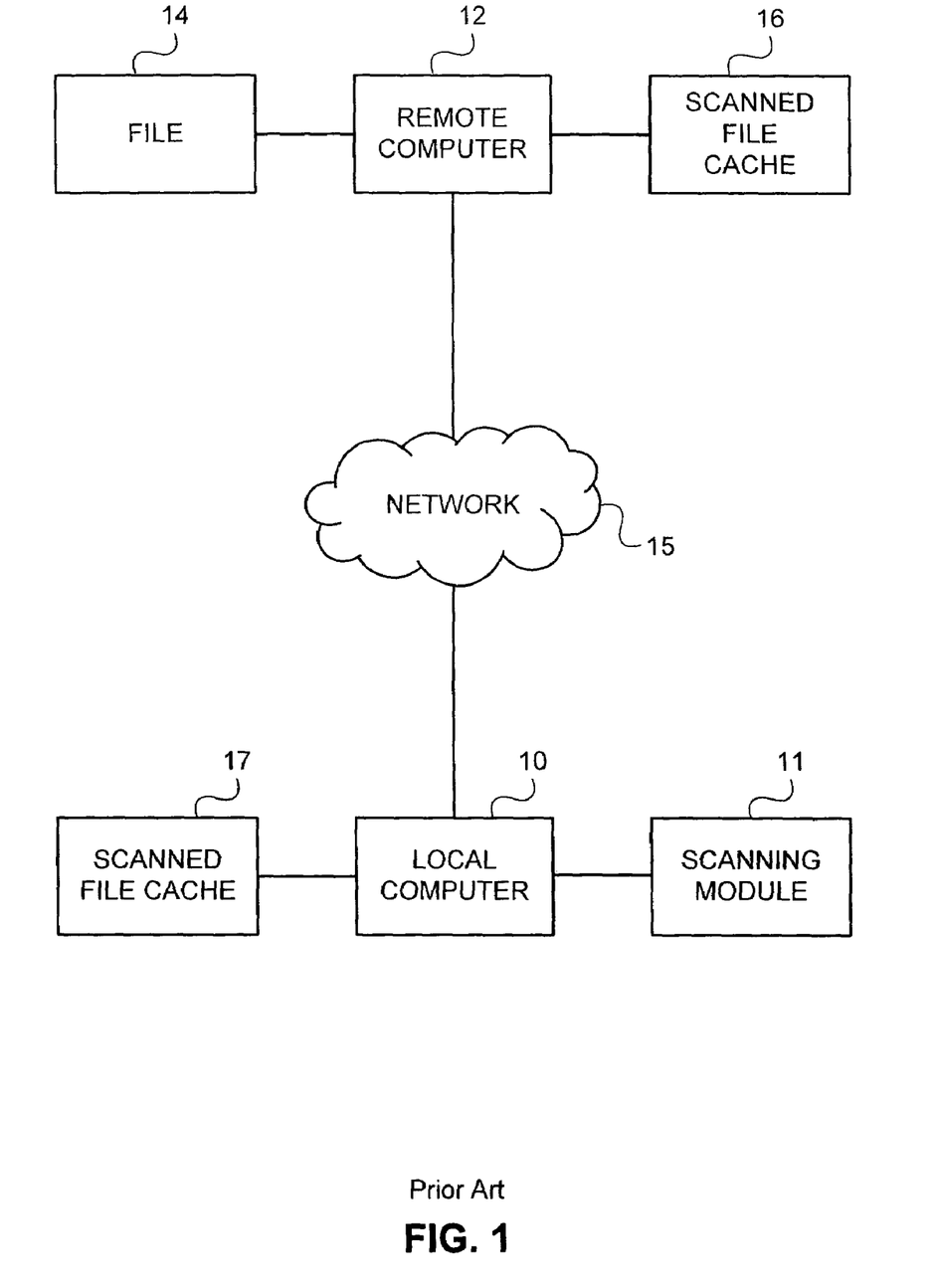
FIG. 1 is a system level diagram illustrating a typical configuration of the prior art.

With reference to FIG. 1, when a local computer 10 wishes to open a computer file 14 over a network 15 (i.e., the file 14 is located on or otherwise associated with a remote computer 12 that is coupled to the local computer 10 over the network 15), safety dictates that the file 14 be scanned for the presence of malicious code before the file 14 is opened. Otherwise, the local computer 10 may be infected with malicious code. In conventional systems, a real-time malicious code scanning module 11 associated with the local computer 10 scans the file 14 over the network 15 before the local computer 10 opens the file 14. This is slow and cumbersome, and generates a lot of unwanted network traffic. A scanned file cache 17 associated with the local computer 10 cannot be safely relied upon to verify that the file 14 on the remote computer 12 is free of malicious code. This is because the local computer 10 has no way of tracking changes (e.g., tampering) made to file 14 by the remote computer 12 itself or by any other computer on the network 15 after scanning module 11 completes its scan. Therefore, file 14 cannot be placed in the cache 17 associated with the local computer 10. Since file 14 cannot be safely placed in the cache 17, file 14 it must be scanned every time it is accessed.

What is needed is a technique to reduce the time required to open files that are located remotely, to reduce network traffic, and to reduce the load on the remote computer 12 for handling the extra input and output generated when malicious code scans are done by the local computer 10. These goals are achieved by the present invention.

DISCLOSURE OF INVENTION

Computer implemented methods, apparati, and computer-readable media for quickly and safely opening computer files over a network. In a method embodiment of the present invention, a local computer (10) initiates a test open of a file (14) associated with a remote computer (12) that is coupled to the local computer (10) over the network (15). When the test open discloses that the remote computer (12) has an acceptable malicious code scanning means (13), the local computer (10) performs an actual open of the file (14).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 3:
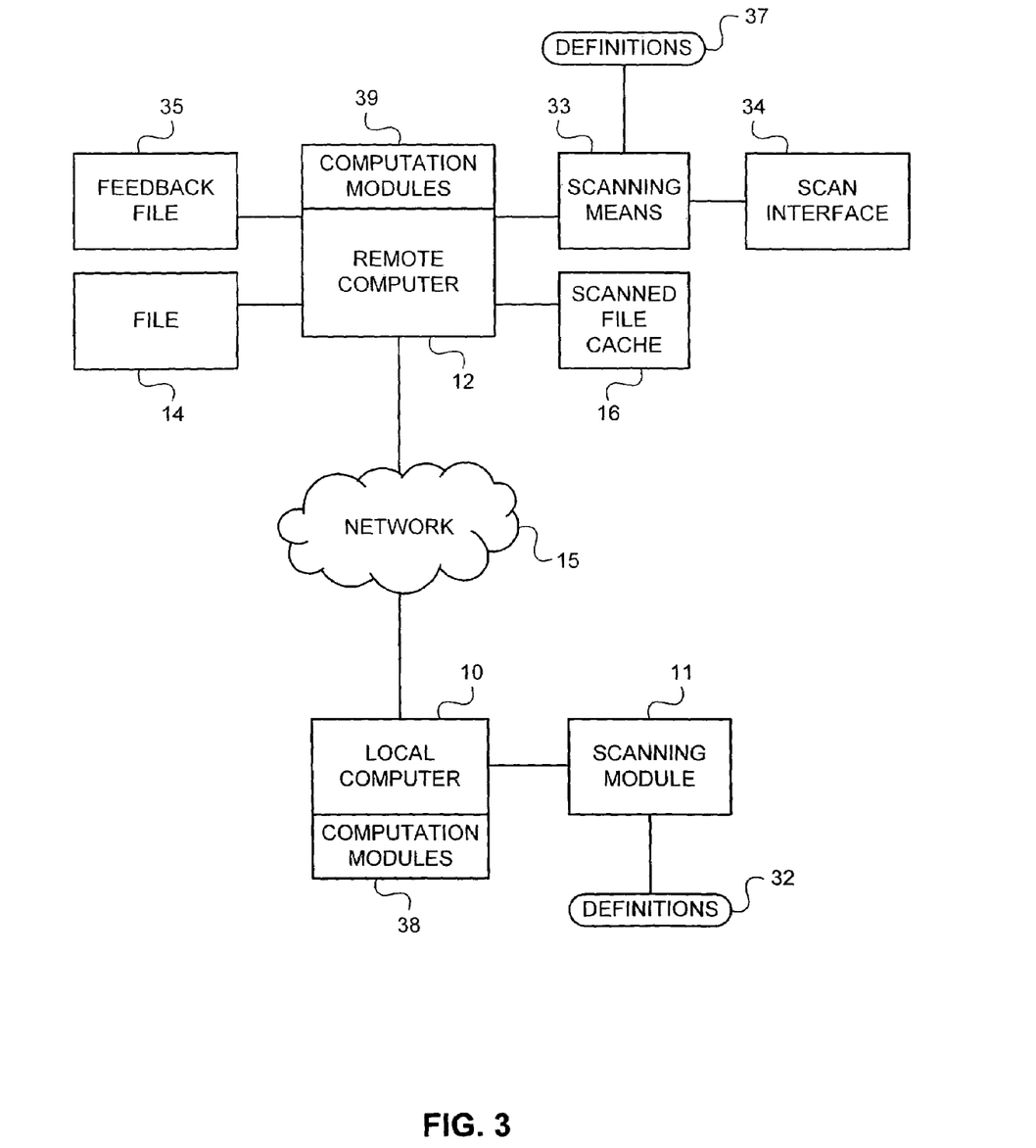
FIG. 3 is a system level diagram illustrating items usable in the present invention.

With reference to FIG. 3, local computer 10 and remote computer 12 are coupled to each other over a network 15. As used herein, "coupled" means any direct or indirect coupling by which computers 10 and 12 may communicate with each other. Network 15 can be any wired or wireless network, or any combination of wired and wireless networks. Thus, network 15 can comprise the Internet, a local area network (LAN), a wide area network (WAN), a WiFi network, a Bluetooth network, etc. Local computer 10 can be thought of as a user computer, and is usually a client computer. Computer 12 is usually a server computer, but it may be a peer of client computer 10. Associated with local computer 10 is malicious code scanning module 11. This may be a real-time module that is capable of detecting malicious code within a computer file such as file 14. A suitable example of module 11 is AutoProtect manufactured by Symantec Corporation of Cupertino, Calif.

Similarly, remote computer 12 may have associated therewith a malicious code scanning means 33. As with scanning module 11, scanning means 33 may be a real-time module capable of detecting malicious code in a computer file such as file 14. Results of scanning means 33 scanning file 14 may be placed into a scanned file cache 16, which can be any type of memory device associated with computer 12.

The broad method steps of the present invention may be performed by suitably modified scanning module 11. These modifications can be performed by one of ordinary skill in the software art. Alternatively, said method steps may be performed by one or more computational modules 38 associated with computer 10, or by a combination of said computational modules 38 working in conjunction with scanning module 11. Similarly, remote computer 12 can be fitted with special computational modules 39 suitable for use in the present invention, and/or scanning means 33 can be appropriately modified for use in the present invention. As a shorthand notation, whenever it is stated herein that local computer 10 performs a certain action, it is meant that the action is performed by module 11 and/or modules 38. Similarly, whenever it is stated herein that remote computer 12 performs a certain action, it is meant that said action is performed by scanning means 33 and/or modules 39. All of the modules and means mentioned in this paragraph can be implemented in software, firmware, hardware, or any combination thereof.

Figure 2:
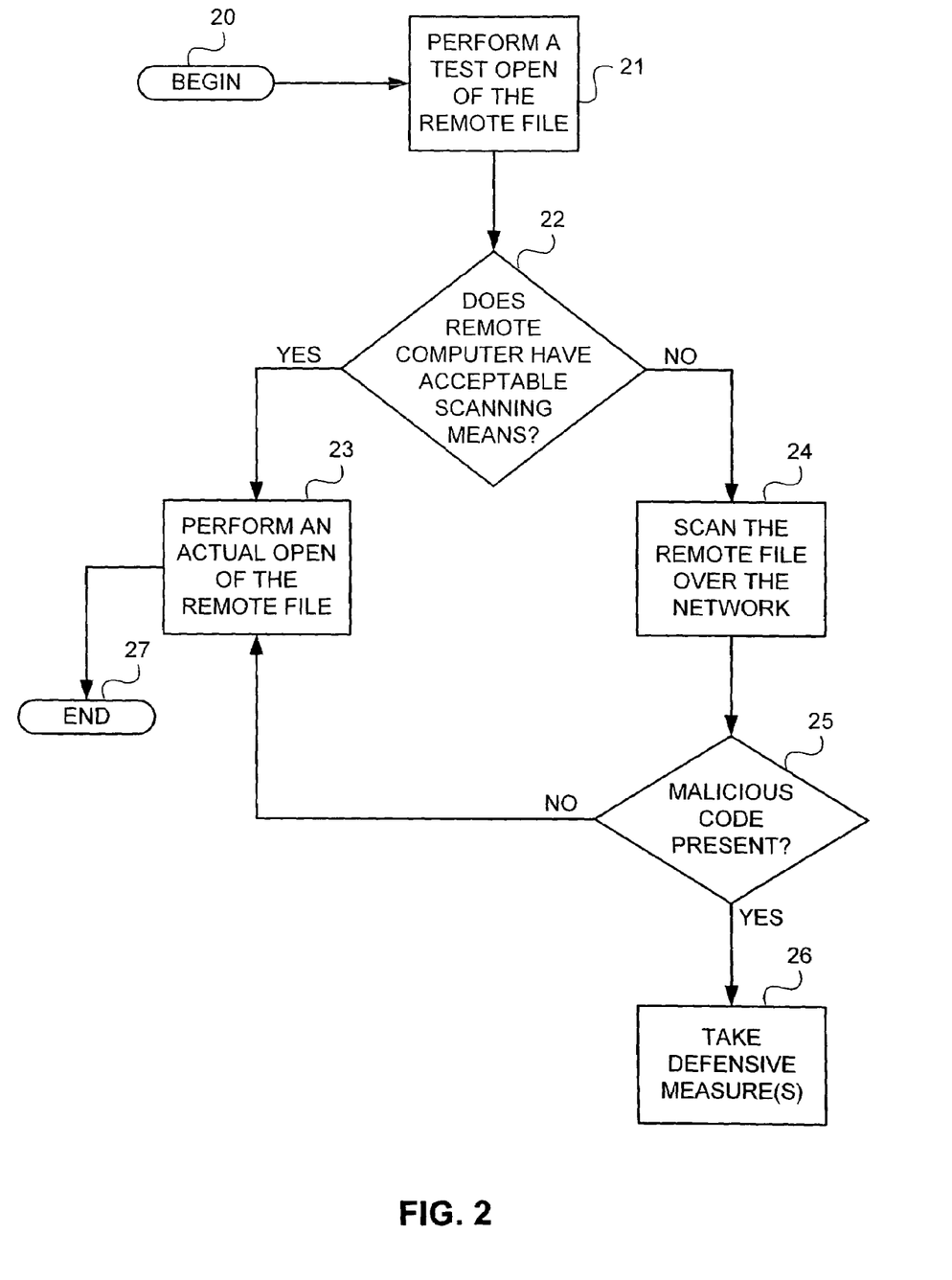
FIG. 2 is a flow diagram illustrating a method embodiment of the present invention.

A method embodiment of the present invention will now be described in conjunction with FIG. 2. The method starts at step 20. At step 21, local computer 10 initiates a test open of file 14.

At step 22, local computer 10 determines, in response to feedback received from remote computer 12, whether remote computer 12 has an acceptable malicious code scanning means 33. "Acceptability" can be defined in a number of ways, and is pre-determined prior to operation of the present invention. For example, an "acceptable" malicious code scanning means 33 can be defined to be one which satisfies one or more of the following criteria: the scanning means 33 is present, active (switched on), capable of scanning file 14, contains malicious code definitions that are at least as current as those associated with malicious code scanning module 11, has an acceptable definition window, scans all appropriate file extensions, has a heuristic level set to at least a certain amount, has any other settings that the means 33 is capable of. An "acceptable definition window" can be a time window such as "malicious code definitions are not more than a week old".

If local computer 10 determines at step 22 that remote computer 12 has acceptable malicious code scanning means 33, the method proceeds to step 23, where the local computer 10 performs an actual open of the file 14 on the remote computer 12. The remote computer 12 ensures the file 14 is free of malicious code by locating the file 14 in the remote cache 16, or else computer scans file 14 at its discretion. The rationale for this reliance is that if remote computer 12 has an acceptable malicious code scanning means 33, there is no need for local computer 10 to perform a slow, cumbersome malicious code scan on file 14 over network 15. In essence, a trust relationship has been created between the local 10 and remote 12 computers. Based on the positive response from computer 12, computer 10 trusts computer 12 to have adequately scanned the file 14 prior to computer 10 receiving its contents, and therefore computer 10 performs no additional scan. The method then ends at step 27.

If, on the other hand, step 22 discloses that remote computer 12 does not have an acceptable malicious code scanning means 33, the method proceeds to step 24, where local computer 10 scans file 14 over the network 15, since local computer 10 cannot rely on any scanning of file 14 by remote computer 12. Then at step 25, local computer 10 inquires as to whether the result of the scan indicates that malicious code may be present within file 14. If not, step 23 is performed as before.

If, on the other hand, step 25 indicates that malicious code may be present within file 14, step 26 is performed. At step 26, local computer 10 performs at least one defensive measure from the group of measures comprising: a false positive mitigation technique; a verification that malicious code is in fact present within file 14; an alert to a system administrator for an enterprise incorporating local computer 10; aborting the opening of file 14; quarantining file 14; sending file 14 to an antivirus research center such as Symantec Antivirus Research Center (SARC); setting a flag to preclude subsequent downloads of files from remote computer 12; initiating an investigation as to why remote computer 12 may have become infected with malicious code; any other measure that one of prudence and good judgment might take when informed that malicious code might be present.

Is it useful to note that when computer 10 tries to perform step 23, it may be the case that computer 12 has initiated similar defensive action. For this reason, computer 10 may not be able to open file 14 at step 23 due to computer 12's defensive measures. In that case, access to file 14 will be denied to the protected local computer 10.

One technique by which local computer 10 can initiate a test open in step 21 is for local computer 10 to append a tag to the pathname for file 14. The tag may comprise a globally unique identifier (GUID) of computer 10 (useful to identify computer 10 when computer 10 is but one of many computers in an enterprise) and the date that malicious code definitions 32 associated with malicious code scanning module 11 were last updated. The GUID can be based on the MAC (Message Authentication Code) associated with computer 10. In this embodiment, the presence of the tag creates a pathname for a file that is not likely to exist within the purview of computer 12. Thus, computer 12 should not be able to open such a file. If remote computer 12 is able to open such a file, it indicates that something is wrong: perhaps a malicious individual is spoofing the system, or the presence of the tag has accidentally resulted in a valid pathname for a file other than file 14. Thus, if remote computer 12 opens a file during the test open, in this embodiment local computer 10 retries the test open by changing the GUID portion of the tag so that the augmented pathname does not correspond to an actual file. Alternatively, computer 10 may choose to revert to the more time consuming method of scanning file 14 over the network 15.

An example of a pathname of file 14 is:

C:\roberta\jake

In this example, the pathname augmented with a tag having a GUID of computer 10 and the most recent definitions 32 update date might be:

C:\roberta\jake8163412aug2003

The contents of the tag are tailored to the preselected acceptability criteria. For example, if one of the acceptability criteria is that scanning means 33 must have its heuristic level set to at least a certain amount, then this required heuristic level is part of the tag. It also may be desirable to affix the name of local computer 10 and/or the IP (Internet Protocol) address of local computer 10 as part of the tag. This enables tracing the origins of malicious code if the attempted open causes malicious code to enter remote computer 12.

In response to the test open, remote computer 12 sends to local computer 10 a message conveying information pertaining to malicious code scanning capabilities of remote computer 12. In one embodiment, the message is sent over the same file open channel that is used for the opening of file 14 over the network 15. Using the same file open channel makes the query of the remote computer 12 quick and simple, and piggybacks onto the security of the file open channel itself. This simplicity is evident at both remote computer 12 and local computer 10. The remote computer 12 checks the end of the pathname for the tag, compares definition dates and file exclusions (if these are part of the acceptability criteria), and returns the result to the local computer 10. The local computer 10 manufactures a file open that is a simple modification of an existing open, and checks the results received from the remote computer 12.

In an alternative embodiment, the message from the remote computer 12 to the local computer 12 is sent via a channel other than the file open channel. This can be done by opening a port and sending packets back and forth between the two computers 10,12 using TCP (Transport Control Protocol), UDP (Universal Datagram Protocol), ICMP (Internet Control Management Protocol), etc. Other possibilities are to use DCOM (Distributed Communications Object Method), WMI, SNMP (Simple Network Management Protocol), RPC (Remote Procedure Calls), etc.

The message returned from computer 12 to computer 10 contains information pertinent to the pre-established acceptability criteria. In one embodiment, said message contains information as to whether the remote computer 12 has malicious code scanning means 33, and whether definitions 37 associated with said scanning means 33 are at least as new as the definitions 32 associated with the malicious code scanning module 11 of the local computer 10. The local computer 10 then decodes the message. When the message reveals that the remote computer 12 has malicious code scanning means 33, and the malicious code scanning means 33 has definitions 37 at least as new as the definitions 32 in the malicious code scanning module 11 associated with local computer 10, remote computer 12 scans file 14, then local computer 10 performs an actual open on file 14, relying on said scan by computer 12. When these acceptability conditions are not satisfied, however, local computer 10 does not rely on remote computer 12 to perform the scan, and instead itself performs a malicious code scan of file 14 over the network 15, slow and cumbersome as that might be.

The message returned from computer 12 to computer 10 can be a set of one or more error messages. For example, in a WIN32 operating system, the conventional 32 bit error code can be used. For example:

The error message "file not found" can mean that there is no scanning means 33 associated with remote computer 12;

The error message "access denied" can mean that there is scanning means 33 associated with remote computer 12; and The error message "error 18" can mean that there is scanning means 33 associated with remote computer 12 and it meets all the pre-established acceptability criteria.

This is just one example.

It should be noted that in this example, by failing the open on the remote system 12 regardless of the presence of scanning software 33, there is only one round trip on the network 15 needed for computer 10 to query for the status of the remote computer's scanning means 33.

In one embodiment, when remote computer 12 detects the test open that has been initiated by local computer 10, remote computer 12 asynchronously begins to scan file 14 using scanning means 33. The rationale for this is that the presence of a test open indicates that there is a high probability that remote computer 12 will be called upon shortly to perform said scan, so it may as well start as soon as possible to save time. Such a scan may very well be completed before the "actual open" command is issued by computer 10. The results of the scan are typically placed into scanned file cache 16, which is typically but not necessarily set up as a LRU (Least Recently Used) cache, i.e., the most recent results are placed at the top of the cache.

In another embodiment, a feedback file 35 is established and is associated with remote computer 12. Feedback file 35 has a pathname corresponding to the pathname of file 14 with the tag appended thereto. The purpose of feedback file 35 is to enable more information to be fed back from remote computer 12 to local computer 10 than is typically possible in a simple error message, which in many operating systems is limited to 32 bits. In this embodiment, the test open of feedback file 35 is allowed to succeed, enabling the transmittal of the information contained in feedback file 35 from computer 12 to computer 10.

It is possible for a malicious person to trick computer 10 into opening file 14 without scanning it, e.g., by making it appear that computer 12 has an acceptable scanning means 33 when it does not. In one such type of spoofing, the malicious person installs within computer 12 a file filter driver (such as Symevent manufactured by Symantec Corporation of Cupertino, Calif.) that monitors all file opens. This file filter driver could be programmed to return the pre-established error message indicating that computer 12 has an acceptable scanning means 33 (such as error 18 in the above example). The malicious person can deduce what this error message should be by sniffing the traffic that transpires between computers 10 and 12. Tricking computer 10 in this fashion enables the malicious person to send malicious code to computer 10 when the actual open of file 14 occurs.

In another type of spoofing, there is no file filter driver, but rather the malicious person takes over the entirety of remote computer 12, setting up in essence a file server honeypot. When an actual open of file 14 occurs, malicious code is sent from computer 12 to computer 10. In this case, there is no scanning means 33 associated with computer 12.

Such spoofing can be countered by having the local computer 10 authenticate the remote computer 12 prior to initiating any test opens. One way of doing this is to use public key cryptography, in which the two computers 10,12 exchange digitally signed mutual authentication packets. This requires that the private keys of the computers 10,12 be hidden from malicious persons. Otherwise, the spoof could be continued at the next higher level, i.e., malicious code could be written to spoof the authentication.

Another way to provide authentication is for the two computers 10,12 to trade a malicious code fragment for a unique malicious code identifier. The malicious code identifier is a unique number associated with that malicious code. Just a fragment, rather than the entire malicious code, is sent, because sending the entire malicious code would take too much time. The trade can be in either direction. In one direction, local computer 10 sends the malicious code fragment to remote computer 12, and remote computer 12 sends the malicious code identifier to local computer 10. In the other direction, local computer 10 sends the malicious code identifier to remote computer 12, and remote computer 12 sends the malicious code fragment to local computer 10. The rationale for this technique is that one computer requests from the other computer knowledge that only the other computer has, in this case the knowledge of identifying malicious code. So, for example, the authentication message can contain an obfuscated fragment of malicious code extracted from the definitions (32 or 37) associated with the challenging computer (10 or 12). This code may look very little like real malicious code, and cannot execute because is just a fragment. An acceptable response to the authentication message must include the unique malicious code identifier. This can be done in two ways. In one way, the malicious code fragment is augmented by a standard husk and subjected to a malicious code scan (by scanning means 33 or scanning module 11). In the other way, scanning means 33 or scanning module 11 is pre-fitted with a scan interface 34 that converts malicious code fragments into unique malicious code identifiers, e.g., by using a lookup table. In either way, it is desirable that the challenge message sent between each pair of computers 10,12 is different each time such a message is sent, and does not follow a predictable pattern or start at a predictable location in the list of definitions (32 or 37). A computer 10,12 that sends the same challenge pattern or response each time should be flagged as suspicious by the other computer 12,10. This minimizes the possibility of replay attacks, i.e., attacks premised upon sending a known response to a known challenge based upon having intercepted a communication showing the challenge/response. To further minimize replay attacks, challenges should be composed from relatively new definitions in the set of definitions (32 or 37).

It is not necessary to perform this authentication procedure every time a file 14 is opened. A user of computer 10,12 can turn the authentication on or off at will, the authentication can be performed every so many file opens, etc. The important thing is for the link between computers 10,12 to be authenticated prior to the first time these two computers 10,12 share a file 14.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for a local computer coupled to a remote computer over a network to open a computer file stored by the remote computer comprising:
   initiating a test open of the computer file stored by the remote computer, wherein the test open comprises appending a tag to a pathname for the computer file and requesting that the remote computer open the computer file with the tag and the pathname;
   receiving a feedback response conveying information about the tag and the pathname from the remote computer responsive to a failed test open;
   determining that the remote computer has an acceptable malicious code scanning capability responsive to the feedback response; and
   causing the local computer to open the computer file stored by the remote computer responsive to determining that the remote computer has an acceptable malicious code scanning capability.

2. The method of claim 1 wherein the tag comprises a globally unique identifier, and further comprising:
   changing the globally unique identifier to correspond to a nonexistent file responsive to a successful test open; and
   initiating a second test open.

3. The method of claim 1 wherein the tag includes a globally unique identifier of the local computer and a date corresponding to a most recent update of a set of malicious code definitions associated with a malicious code scanning module associated with the local computer.

4. The method of claim 1 wherein the tag includes data identifying at least one criterion defining an acceptable malicious code scanning capability, the at least one criterion selected from a group of criteria consisting of:
   an acceptable heuristic level for malicious code scans;
   an acceptable definition window for malicious code scans;
   a name of the local computer; and
   an IP address of the local computer.

5. The method of claim 3 further comprising initiating a second test open of the computer file responsive to the remote computer opening the computer file during the test open, the second test open being initiated by changing the globally unique identifier portion of the tag to correspond to a name of the local computer and the internet protocol address of the local computer.

6. The method of claim 1 wherein the feedback response comprises one or more messages sent from the remote computer.

7. The method of claim 6 wherein the one or more messages is sent from the remote computer to the local computer as an error message over a file open channel.

8. The method of claim 6 wherein the one or more messages is sent from the remote computer to the local computer over a channel other than a file open channel.

9. The method of claim 8 wherein the channel used for the one or more messages uses at least one of TCP, UDP, ICMP, DCOM, WMI, SNMP, and RPC.

10. The method of claim 6 wherein the one or more messages contain information communicating that the remote computer has a malicious code scanning capability and a set of malicious code definitions associated with the scanning capability that are at least as new as a set of malicious code definitions associated with a malicious code scanning module associated with the local computer.

11. The method of claim 6 further comprising the step of the local computer decoding the one or more messages.

12. The method of claim 11 wherein the local computer determines that the remote computer has an acceptable malicious code scanning capability responsive to decoding the one or more messages from the remote computer and the one or more messages communicating that the remote computer has a malicious code scanning capability and a set of malicious code definitions at least as new as a set of malicious code definitions in a malicious code scanning module associated with the local computer.

13. The method of claim 11 wherein the local computer performs a malicious code scan of the computer file over the network responsive to the one or more messages communicating that the remote computer does not contain an acceptable malicious code scanning capability.

14. The method of claim 13 wherein the local computer actually opens the computer file responsive to the malicious code scan of the computer file done over the network indicating that the computer file does not contain malicious code.

15. The method of claim 13 wherein responsive to the malicious code scan of the computer file done over the network indicating that the computer file may contain malicious code, the local computer performs at least one defensive measure selected from the group of measures consisting of:
   a false positive mitigation technique;
   verification that malicious code is in fact present within the computer file;
   an alert to a system administrator;
   aborting the opening of the computer file;
   quarantining the computer file;
   sending the computer file to an antivirus research center;
   precluding subsequent downloads from the remote computer;
   initiating an investigation as to why the remote computer may have become infected with malicious code.

16. The method of claim 1 wherein the remote computer asynchronously starts a scan of the computer file responsive to the remote computer detecting the test open.

17. The method of claim 1 wherein the local computer authenticates the remote computer prior to initiating the test open.

18. The method of claim 17 wherein the authentication is performed using public key cryptography.

19. The method of claim 17 wherein the authentication is performed by the local and remote computers trading a malicious code fragment for a malicious code identifier, the authentication comprising a query and an answer, the malicious code fragment being the answer for the query comprising the malicious code identifier and the malicious code identifier being the answer for the query comprising the malicious code fragment.

20. The method of claim 19 wherein the local computer sends the malicious code fragment to the remote computer, and the remote computer sends the malicious code identifier to the local computer.

21. The method of claim 19 wherein the local computer sends the malicious code identifier to the remote computer, and the remote computer sends the malicious code fragment to the local computer.

22. The method of claim 19 wherein the malicious code fragment is matched to the malicious code identifier via a malicious code scan interface.

23. The method if claim 1 further comprising the remote computer scanning the computer file for the presence of malicious code responsive to the test open disclosing that the remote computer has an acceptable malicious code scanning capability.

24. A computer-readable medium containing computer program instructions for enabling a local computer to open a computer file stored by the remote computer coupled to the local computer over a network, said computer program instructions performing the steps of:

initiating a test open of the computer file stored by the remote computer, wherein the test open comprises appending a tag to a pathname for the computer file and requesting that the remote computer open the computer file with the tag and the pathname;

receiving a feedback response conveying information about the tag and the pathname from the remote computer responsive to a failed test open;

determining that the remote computer has an acceptable malicious code scanning capability responsive to the feedback response; and     causing the local computer to open the computer file stored by the remote computer responsive to determining that the remote computer has an acceptable malicious code scanning capability.

25. A system for enabling a local computer to open a computer file stored by a remote computer, said remote computer coupled to the local computer over a network, said system comprising a scanning module for performing functions comprising:

initiating a test open of the computer file stored by the remote computer, wherein the test open comprises appending a tag to a pathname for the computer file and requesting that the remote computer open the computer file with the tag and the pathname;

receiving a feedback response conveying information about the tag and the pathname from the remote computer responsive to a failed test open;

determining that the remote computer has an acceptable malicious code scanning capability responsive to the feedback response; and     causing the local computer to open the computer file stored by the remote computer responsive to determining that the remote computer has an acceptable malicious code scanning capability.

26. A method for a local computer coupled to a remote computer over a network to open a computer file stored by the remote computer comprising:

initiating a test open of the computer file stored by the remote computer, wherein initiating the test open comprises appending a tag to a file name that causes the test open to fail;

receiving a feedback response from the remote computer indicating a failed test open;

determining that the remote computer has an acceptable malicious code scanning capability responsive to the feedback response; and     opening the computer file stored by the remote computer responsive to determining that the remote computer has an acceptable malicious code scanning capability.

\* \* \* \* \*

UNITED STATES PATENT AND TRADEMARK OFFICE
CERTIFICATE OF CORRECTION

| | | |
|---|---|---|
| PATENT NO. | : 7,484,094 B1 | Page 1 of 1 |
| APPLICATION NO. | : 10/846100 | |
| DATED | : January 27, 2009 | |
| INVENTOR(S) | : John Millard and Mark Spiegel | |

It is certified that error appears in the above-identified patent and that said Letters Patent is hereby corrected as shown below:

Claim 23, Column 8, line 66, delete "if" and insert --of-- in place thereof.

Signed and Sealed this

Thirty-first Day of March, 2009

JOHN DOLL
*Acting Director of the United States Patent and Trademark Office*